(12) United States Patent
Haines et al.

(10) Patent No.: US 11,149,807 B2
(45) Date of Patent: Oct. 19, 2021

(54) HYDRAULIC CALIPER DISC BRAKE WITH SPHERICAL-FACED WASHERS

(71) Applicant: Ausco Producs, Inc., Benton Harbor, MI (US)

(72) Inventors: James W. Haines, Edwardsburg, MI (US); Keith R. McAllister, Kalamazoo, MI (US); Kenneth A. Dodd, Dowagiac, MI (US); Brian P. Dennis, Kalamazoo, MI (US); Norman D. Crawford, St. Joseph, MI (US); Peter J. Pozivilko, St. Joseph, MI (US)

(73) Assignee: Ausco Products, Inc., Benton Harbor, MI (US)

( * ) Notice: Subject to any disclaimer, the term of this patent is extended or adjusted under 35 U.S.C. 154(b) by 0 days.

(21) Appl. No.: 16/722,267

(22) Filed: Dec. 20, 2019

(65) Prior Publication Data

US 2020/0378456 A1    Dec. 3, 2020

Related U.S. Application Data

(60) Provisional application No. 62/856,261, filed on Jun. 3, 2019.

(51) Int. Cl.
| | |
|---|---|
| *F16D 55/18* | (2006.01) |
| *F16D 55/228* | (2006.01) |
| *F16D 65/18* | (2006.01) |
| *B60T 1/06* | (2006.01) |
| *F16D 125/06* | (2012.01) |
| *F16D 121/04* | (2012.01) |

(52) U.S. Cl.
CPC ........... *F16D 55/228* (2013.01); *F16D 65/18* (2013.01); *B60T 1/065* (2013.01); *F16D 2121/04* (2013.01); *F16D 2125/06* (2013.01)

(58) Field of Classification Search
CPC .... F16D 2125/06; F16D 55/228; F16D 65/18; F16D 65/183; F16D 2121/04
See application file for complete search history.

(56) References Cited

U.S. PATENT DOCUMENTS 3,224,532 A * 12/1965 Simon ................... F16D 55/228
188/370
5,031,511 A * 7/1991 Villata .................... F16D 65/84
92/128

(Continued)

FOREIGN PATENT DOCUMENTS

DE    3906827 A1 *  9/1990  ......... F16D 65/0979
JP    11030258 A  *  2/1999  ............. F16D 65/14

OTHER PUBLICATIONS

Machine translation of JP-11030258 (no date).*
Machine translation of DE 3906827 (no date).*

*Primary Examiner* — Nicholas J Lane
(74) *Attorney, Agent, or Firm* — Renner, Kenner, Greive, Bobak, Taylor & Weber

(57) ABSTRACT

A hydraulic caliper disc brake includes an opposing pair of pistons adapted to act on an opposing pair of washers adapted to act on an opposing pair of stator assemblies, each of the pistons comprising a spherical piston face, each of the washers comprising a spherical washer face abutting a respective one of the spherical piston faces, and a straight washer face opposite the spherical washer face and abutting a respective one of the stator assemblies.

14 Claims, 12 Drawing Sheets

(56) References Cited

U.S. PATENT DOCUMENTS

| | | | |
|---|---|---|---|
| 7,156,212 B1* | 1/2007 | Ciotti .................... | F16D 55/228 |
| | | | 188/72.4 |
| 7,597,178 B2 | 10/2009 | Dennis et al. ............... | 188/72.4 |
| 8,272,484 B1 | 9/2012 | Dennis et al. ............... | 188/72.5 |
| 2005/0167211 A1* | 8/2005 | Hageman ................ | F16D 65/18 |
| | | | 188/71.9 |
| 2011/0017553 A1* | 1/2011 | Maehara ............... | F16D 65/183 |
| | | | 188/71.9 |
| 2011/0297490 A1 | 12/2011 | Dennis et al. ............... | 188/72.3 |
| 2012/0085598 A1 | 4/2012 | Dennis ......................... | 188/72.6 |
| 2019/0032735 A1* | 1/2019 | Lethorn .............. | F16D 65/0006 |

\* cited by examiner

HYDRAULIC CALIPER DISC BRAKE WITH SPHERICAL-FACED WASHERS

CROSS REFERENCE TO RELATED APPLICATIONS

This application claims the benefit of U.S. Provisional Application No. 62/856,261, filed Jun. 3, 2019, which is incorporated herein by reference.

TECHNICAL FIELD

This invention relates to a hydraulic caliper disc brake including spherical-faced washers. More particularly, this invention relates to a hydraulic caliper disc brake including spherical-faced washers positioned between respective pistons and stators, where the spherical-faced washers enable the stators to move to a shifted position.

BACKGROUND ART

In certain caliper disc brakes, clearance between a caliper piston and a housing piston bore is tight, and therefore tolerances are also tight. If the caliper piston is not centrically loaded, it will angle within the bore and therefore cause the piston to lock-up.

For prevention of piston lock-up, an associated rotor should be parallel to a face of a stator assembly being acted on by the piston. To keep the rotor parallel to the face of the stator assembly, a brake mounting bracket must be properly aligned to the rotor. If the mounting bracket is not parallel to the rotor, these brakes generally cannot be used until the out-of-parallel mounting bracket is shimmed into parallel alignment with the rotor. This may include placing a shim in between the mounting bracket and the brake, or between the mounting bracket and another component of a vehicle. However, this is a cumbersome and time-consuming task, and is highly dependent upon the skill of an installer.

Therefore, there is a need in the art for a hydraulic caliper disc brake that allows the pistons and the stators to move to a shifted position to thereby enable proper operation of the brake.

SUMMARY OF THE INVENTION

In general, a hydraulic caliper disc brake with spherical-faced washers is provided. Corresponding methods of operation are also provided.

In accordance with an aspect of the invention, the hydraulic caliper disc brake may include an opposing pair of pistons adapted to act on an opposing pair of washers adapted to act on an opposing pair of stator assemblies, each of the pistons comprising a spherical piston face, each of the washers comprising a spherical washer face abutting a respective one of the spherical piston faces, and a straight washer face opposite the spherical washer face and abutting a respective one of the stator assemblies.

In accordance with an aspect of the invention, a method of operating the hydraulic caliper disc brake may include steps of providing the hydraulic caliper disc brake, providing hydraulic force to each of the pistons to thereby cause the pistons to move the stator assemblies toward a rotor, and allowing, upon contact of the stator assemblies with the rotor, each of the washers to shift with respect to the rotor, such that the stator assemblies become parallel with the rotor.

An exemplary hydraulic caliper disc brake according to the concepts of the present invention is shown by way of example in the accompanying drawings without attempting to show all the various forms and modifications in which the invention might be embodied, the invention being measured by the appended claims and not by the details of the specification.

DETAILED DESCRIPTION OF THE INVENTION

Figure 1:
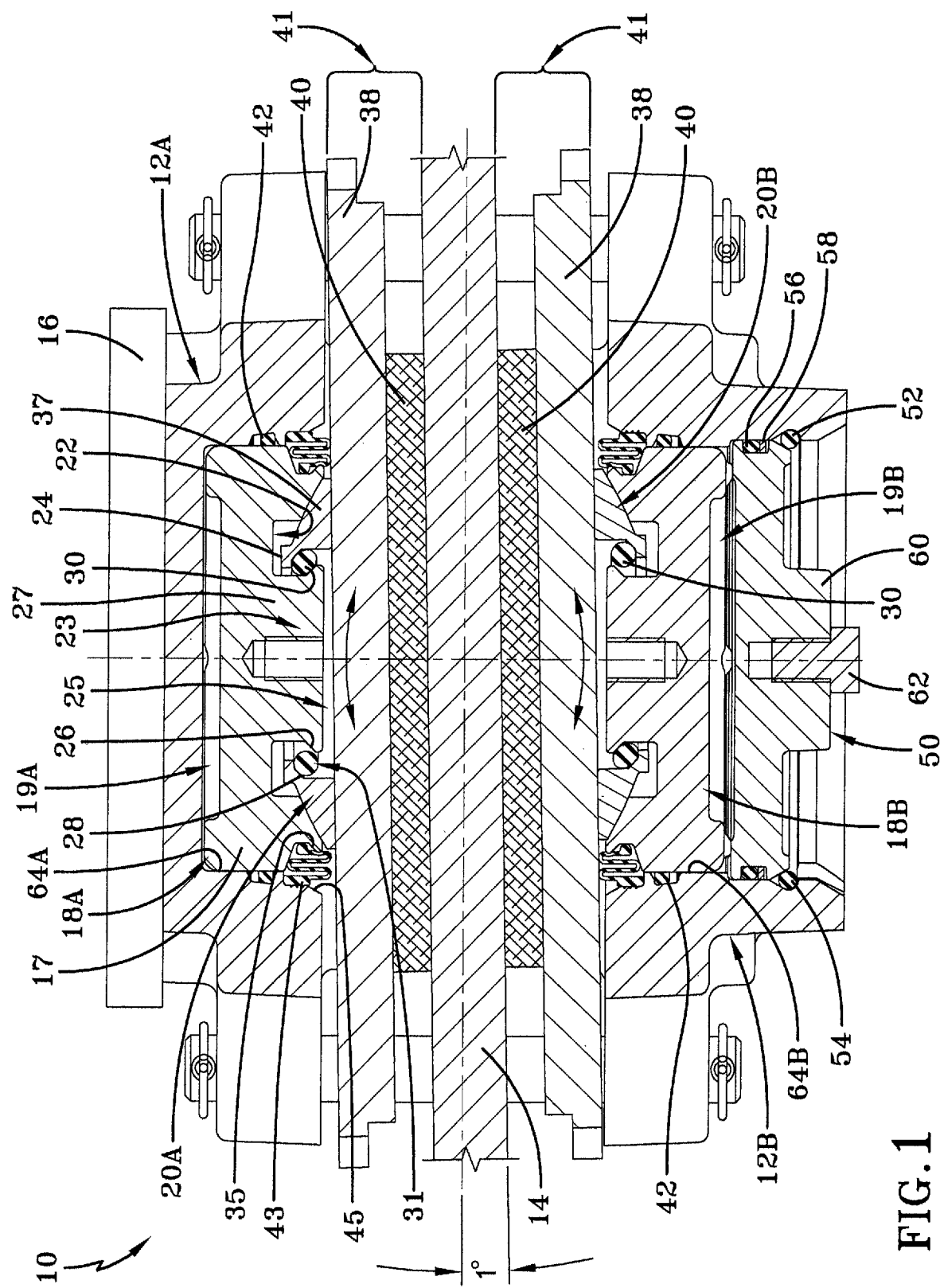
FIG. 1 is a top sectional view of a hydraulic caliper disc brake showing the brake in a braking position with an out-of-parallel rotor according to the concepts of the present invention.
Figure 2:
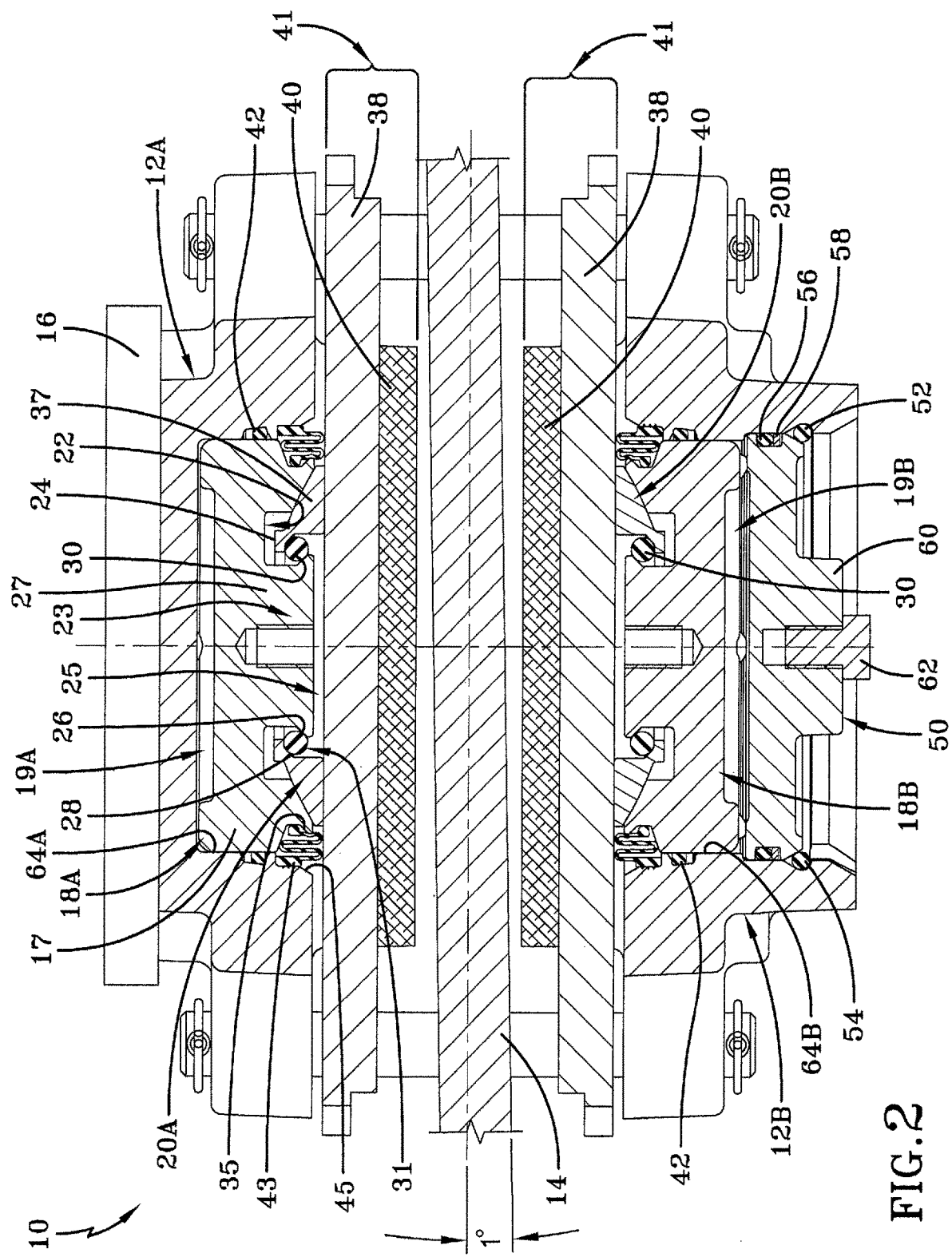
FIG. 2 is a top sectional view of the hydraulic caliper disc brake of FIG. 1, showing the brake in a non-braking position according to the concepts of the present invention.

Referring now to the Figures, particularly FIGS. 1 and 2, a hydraulic caliper disc brake according to the concepts of the present invention is generally indicated by the numeral 10. Hydraulic caliper disc brake 10, which may also be referred to as brake 10, caliper brake 10, or hydraulic caliper brake 10, includes a housing 12, made of a first housing portion 12A and a second housing portion 12B, that carries and protects components of brake 10 and locates brake 10 in operative relation to a rotor 14, which may also be referred to as a disc 14. As will be further described herein, embodiments of the invention may be particularly useful for a rotor 14 that is in a slightly out-of-parallel position with respect to a mounting bracket 16, as shown in FIGS. 1 and 2. Though, it should also be appreciated that brake 10 may also be utilized with a rotor that is in a parallel position with respect to mounting bracket 16.

First housing portion 12A of housing 12 retains a first piston 18A and allows first piston 18A to suitably travel therewithin. Second housing portion 12B of housing 12 retains a second piston 18B and allows second piston 18B to suitably travel therewithin. Each piston 18A, 18B includes a body portion 17 having a generally cylindrical perimeter.

Each piston 18A, 18B abuts, and may be said to carry, a respective spherical-faced washer 20A, 20B, which may also be referred to as spherical washers 20A, 20B. As will be further described herein, the configuration of pistons 18A, 18B and spherical-faced washers 20A, 20B allows spherical-faced washers 20A, 20B to move from a default position to a shifted position. The default position may also be referred to as a non-braking position, non-pressurized position, or non-energized position. Pistons 18A, 18B and spherical-faced washers 20A, 20B may generally be made of inflexible, metallic material, such that the shape and configuration of pistons 18A, 18B and spherical-faced washers 20A, 20B allows movement from the default position to the shifted position, as opposed to an alternative configuration where spherical-faced washers 20A, 20B were made from a generally flexible material.

For purposes of this specification, and as will be described further herein below, the term spherical as a descriptor (e.g. spherical washers 20A, 20B) is used in a general nature. It should be readily appreciated that the entire shape of the spherical washers is not spherical. Instead, as will be described further herein below, a portion of the outer surface (i.e. a face) of the spherical washers is of a spherical nature. The spherical nature allows movement from the default position to the shifted position. In alternative configurations where the portion of the outer surface of the spherical washers was made of a linear, tapered shape, the relative components would be expected to be locked together and not allow movement from the default position to the shifted position.

Each piston 18A, 18B includes a respective generally cylindrical piston washer channel 22, which may also be referred to as an axial face groove 22, for receiving a respective retaining washer ring 24 of spherical washer 20A, 20B. Piston washer channel 22 may be internally defined by a piston retaining member 23 of piston 18A, 18B. Piston retaining member 23, or at least a portion thereof, is adapted to fit within a respective inner channel 25 of washer 20A, 20B. As perhaps best seen in FIG. 3, piston retaining member 23 may be formed as a generally cylindrical body portion 27 extending to a protruding ring 26. Piston retaining member 23, and body portion 27 and protruding ring 26 thereof, are centrally located with respect to the respective piston 18A, 18B.

Protruding ring 26 may also be referred to as a piston chamfer 26, and particularly an inner portion of protruding ring 26 may be referred to as piston chamfer 26. Piston chamfer 26 is generally positioned within piston washer channel 22 and faces a corresponding washer chamfer 28 in washer 20A, 20B. Each respective combination of piston chamfer 26 and washer chamfer 28 may be said to form a chamfer channel 31. An O-ring 30 may be positioned in each chamfer channel 31. O-rings 30 may be particularly adapted to hold spherical washers 20A, 20B with the respective piston 18A, 18B. O-ring 30 may be said to be trapped between the opposing piston chamfer 26 and washer chamfer 28. This may also be referred to as an interlocking configuration. This interlocking configuration allows for the trapping or capture of O-rings 30 and further ensures proper positioning of washers 20A, 20B during assembly, shipping, and installation of brake 10. Based on this configuration, it should be appreciated that there is little or no risk of washers 20A, 20B falling out from pistons 18A, 18B. O-ring 30 may also generally serve to preclude entry of foreign matter. When desired, such as for repair or maintenance, the interlocking configuration of O-ring 30 may be removed with use of a suitable tool, in order to separate washers 20A, 20B from the respective piston 18A, 18B.

Figure 3:
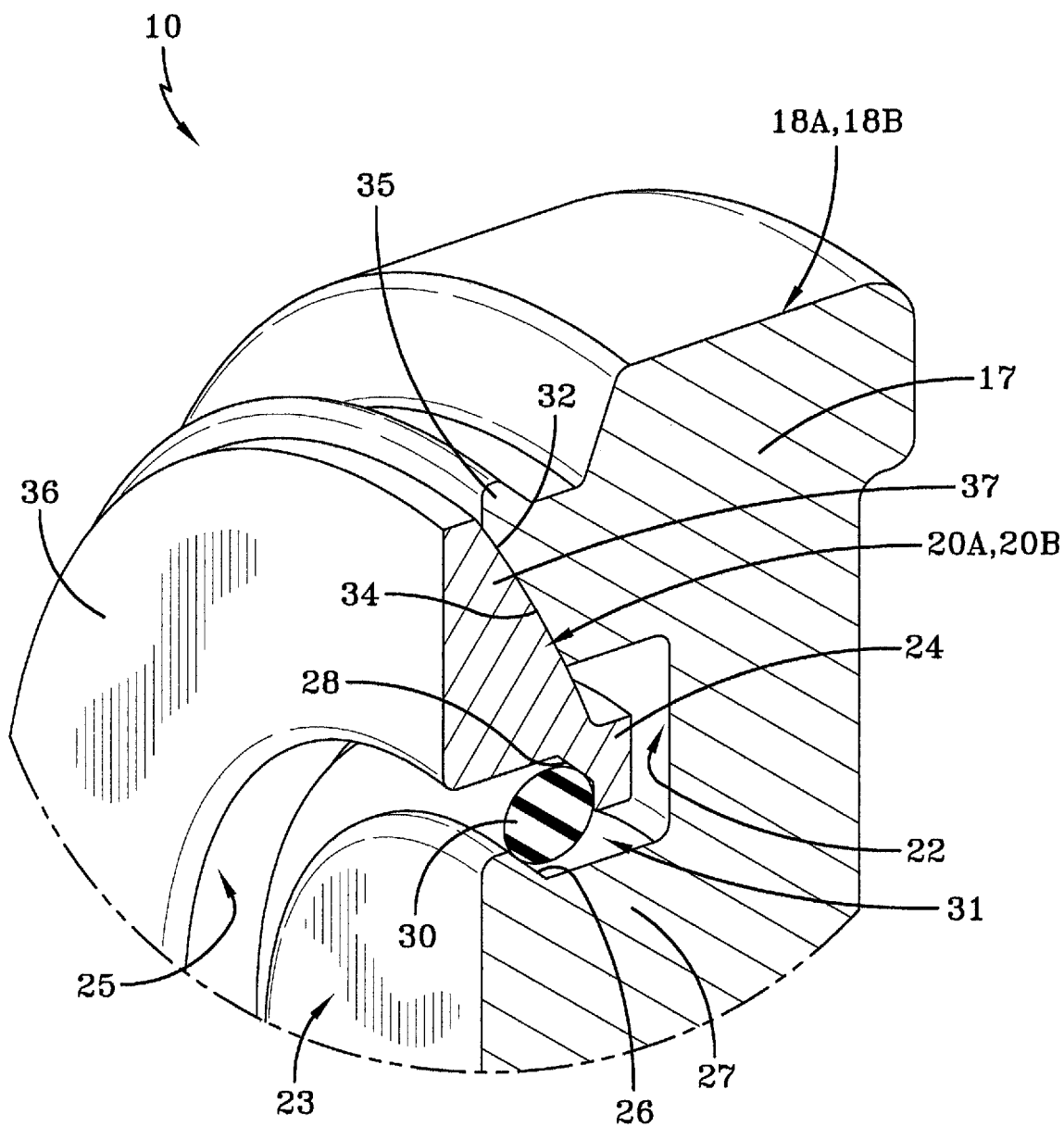
FIG. 3 is a cutaway view of a piston sub assembly of the hydraulic caliper disc brake showing a spherical-faced washer and a piston of the brake according to the concepts of the present invention.
Figure 9:
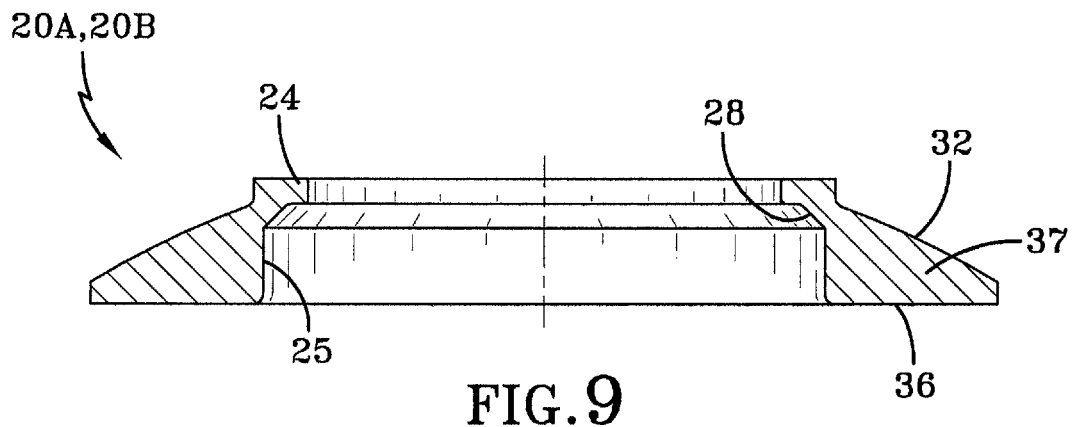
FIG. 9 is a sectional view through the spherical-faced washer according to the concepts of the present invention.

As shown in FIGS. 3 and 9, each spherical washer 20A, 20B includes a spherical washer face 32. Spherical washer face 32 is adapted to abut a respective spherical piston face 34 of pistons 18A, 18B, which may also be referred to as bearing against the respective spherical piston face 34. Spherical washer face 32 may be said to extend to retaining washer ring 24. Spherical washer face 32 and spherical piston face 34 each have the shape of a portion of an outer surface of a sphere. This allows movement of spherical washer face 32 about spherical piston face 34 to a shifted position, as will be further described herein. Alternative definitions for the shape of spherical washer face 32 and spherical piston face 34 may include partially spherical, spherical segment, spherical frustum, spherical zone, or spherical cap with the top truncated. Spherical piston face 34 may extend to a lip 35 of pistons 18A, 18B.

With further reference to FIGS. 2, 3, and 9, each spherical washer 20A, 20B includes a straight face 36, which may also be referred to as a flat face 36, opposing spherical face 32. Straight face 36 and spherical face 32 define a body portion 37 therebetween. Straight face 36 abuts a stator plate 38. Stator plate 38 includes a friction pad 40, such that travel of the stator plates 38 and friction pads 40, upon travel of pistons 18A, 18B, allows friction pads 40 to contact rotor 14 to enact a braking function on rotor 14. The combination of stator plate 38 and friction pad 40 may be referred to as a stator assembly 41.

With reference again to FIGS. 1 and 2, to enact travel of pistons 18A, 18B first housing portion 12A includes a first fluid chamber 19A in fluid communication with first piston 18A and second housing portion 12B includes a second fluid chamber 19B in fluid communication with second piston 12B, The first fluid chamber 19A and the second fluid chamber 19B may be in fluid communication by way of a top fluid channel (not seen).

In the 'default' position of brake 10, that is, when hydraulic pressure provided to brake 10 is 'zero,' brake 10 is in a released, non-braking state. This default position is generally shown in FIG. 2. To actuate brake 10, hydraulic fluid enters first fluid chamber 19A and second fluid chamber 19B, which may be by any suitable technique. As first fluid chamber 19A and second fluid chamber 19B pressurize with hydraulic fluid, pistons 18A, 18B will advance toward rotor 14 once the hydraulic pressure overcomes the force resisting pistons 18A, 18B. The braking position is generally shown in FIG. 1.

This travel of pistons 18A, 18B causes respective friction pads 40, which may also be referred to as stator pads 40, to contact rotor 14. Friction pads 40 may be made of any of numerous friction materials known in the art and may be formed as generally known in the art. Friction pads 40 may be integrally molded to stator plates 38.

Each piston 18A, 18B may include one or more additional corresponding components generally serving one or more functions of precluding entry of foreign matter, providing suitable clearance, and preventing the escape of fluid. For example, each piston 18A, 18B may include a piston boot 43 around a nose of piston 18A, 18B and within a respective piston boot groove 45 in housing 12. Piston boot 43 is in part secured by lip 35. Piston boot 43 provides a secure fit, which may also be referred to as pressed in, within piston boot groove 45. As another example, each piston 18A, 18B may include a square ring 42 for the particular functions of providing drag and preventing contaminants from entering the hydraulic system.

Figure 6:
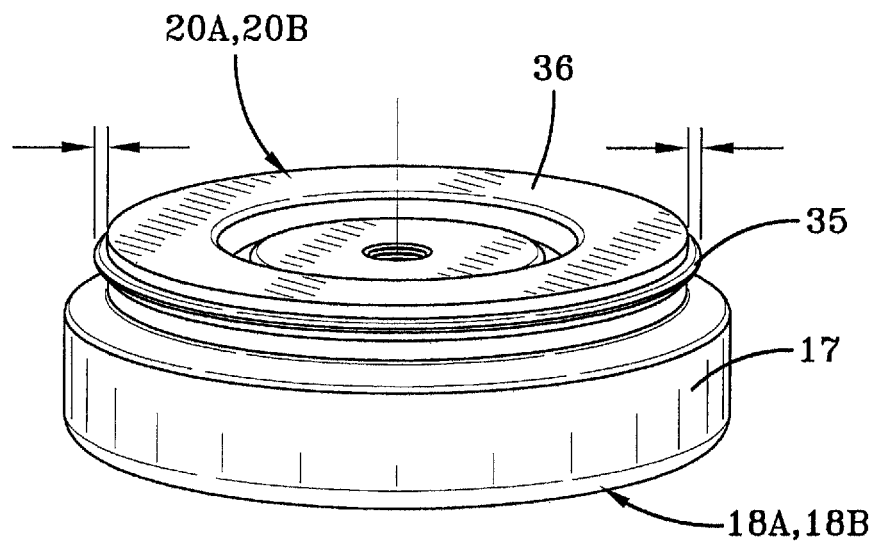
FIG. 6 is a perspective view of the spherical-faced washer and the piston, showing the spherical-faced washer in a default position according to the concepts of the present invention.
Figure 7:
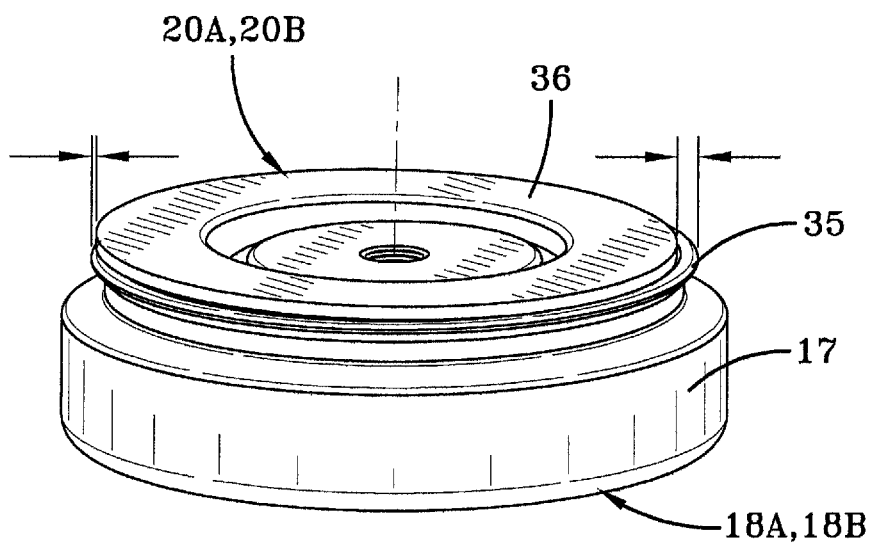
FIG. 7 is a perspective view of the spherical-faced washer and the piston of FIG. 6, showing the spherical-faced washer in a shifted position according to the concepts of the present invention.

As suggested above, brake 10 may be particularly advantageous for use with a rotor 14 that is in a slightly out-of-parallel position with respect to a mounting bracket 16, as shown in FIGS. 1 and 2. When pistons 18A, 18B cause friction pads 40 to contact an out-of-parallel rotor 14, spherical washer face 32 is able to slightly shift, which may also be referred to as rotate, about piston spherical face 34 to go from a default position to a shifted position. The default position of spherical washer face 32 is generally shown in FIGS. 2 and 6. The default position may also be described as the relative components being entirely centrally located. The shifted position of spherical washer face 32 is generally shown in FIGS. 1 and 7, though FIGS. 1 and 7 may generally show a relative exaggerated amount of movement of washer 20A, 20B in order to illustratively demonstrate the shifted position. The shifted position may also be described as the relative components being slightly displaced from central positioning. The shifted position is also illustratively demonstrated by the reference lines in FIGS. 6 and 7.

As shown by the 1° labeling in FIG. 1, in one or more embodiments, the shift in position of spherical washer face 32, as well as washers 20A, 20B, stator plates 38, and pads 40, from the default position to the shifted position may be 1° (degree) or approximate thereto. In other embodiments, this shift in position may be 0.5 degrees or approximate thereto, in other embodiments, 1.5 degrees or approximate thereto, and in still other embodiments, 2 degrees or approximate thereto. In one or more embodiments, this shift in position may be from about 0.5 degrees to about 3 degrees, in other embodiments, from about 0.5 degrees to about 2 degrees, and in still other embodiments, from about 1 degree to about 2 degrees.

As perhaps best seen in FIG. 2, the shift in the position of a first respective component (e.g. washer 20A) may be said to be an opposing or mirrored shift with respect to an opposing respective component (e.g. washer 20B). This shift of the various components generally corresponds with the amount of misalignment of the rotor 14 with respect to the mounting bracket 16 (e.g. 1 degree, as discussed above). Thus, in the shifted position, the shifted components (e.g. washers 20A, 20B and friction pads 40) are parallel with rotor 14, while pistons 18A, 18B remain in their non-shifted position. That is, pistons 18A, 18B remain generally out-of-parallel with rotor 14 and remain generally parallel with mounting bracket 16.

The shift in position of washers 20A, 20B when used with the out-of-parallel rotor 14 is based on the eccentric load that rotor 14 provides to washers 20A, 20B. This eccentric load causes washers 20A, 20B to shift, or rotate, until the straight faces 36, stator plates 38, and pads 40 are generally parallel to rotor 14. Even when washers 20A, 20B are in the shifted position, the load on pistons 18A, 18B remains a centric load. This is based on the washers 20A, 20B having the spherical configuration described elsewhere herein. Since the load on pistons 18A, 18B remains centric, pistons 18A, 18B avoid a cocking position, and brake 10 therefore avoids locking up on this basis.

The travel of the various components from the default position to the shifted position will now be further described. As shown in FIGS. 1, 2, 4, and 5, stator plates 38 are guided along a pair of stator pins 44 on which stator plates 38 are freely slidably mounted. Stator pins 44 are located above the diameter of rotor 14 and at a span approximately the length of stator pads 40. Stator pins 44 additionally react against the torque created by the braking event at rotor 14. In order to allow for the movement of stator plates 38 from the default position to the shifted position, a suitable clearance 46 might be provided between the torque pin 44 outside diameter and a respective torque pin hole 48 in caliper housing 12. This allows stator plates 38 to translate down torque pins 44 at a slight angle corresponding to the shifting, or rotating, of washers 20A, 20B. In one or more embodiments, the clearance 46 between the torque pin 44 outside diameter and torque pin hole 48 may be 0.030" (inches) or approximate thereto.

After placing the various components in the shifted position (i.e. placing brake 10 in the braking position), a user may eventually desire to put brake 10 back in the default position. To release brake 10 back to the default position, the hydraulic fluid pressure is released to 'zero' and some or all of the fluid in the fluid chambers 19A, 19B returns to the fluid source, such as a fluid reservoir. This allows the various components of brake 10 (e.g. pistons 18A, 18B) to travel back to the default position.

Figure 4:
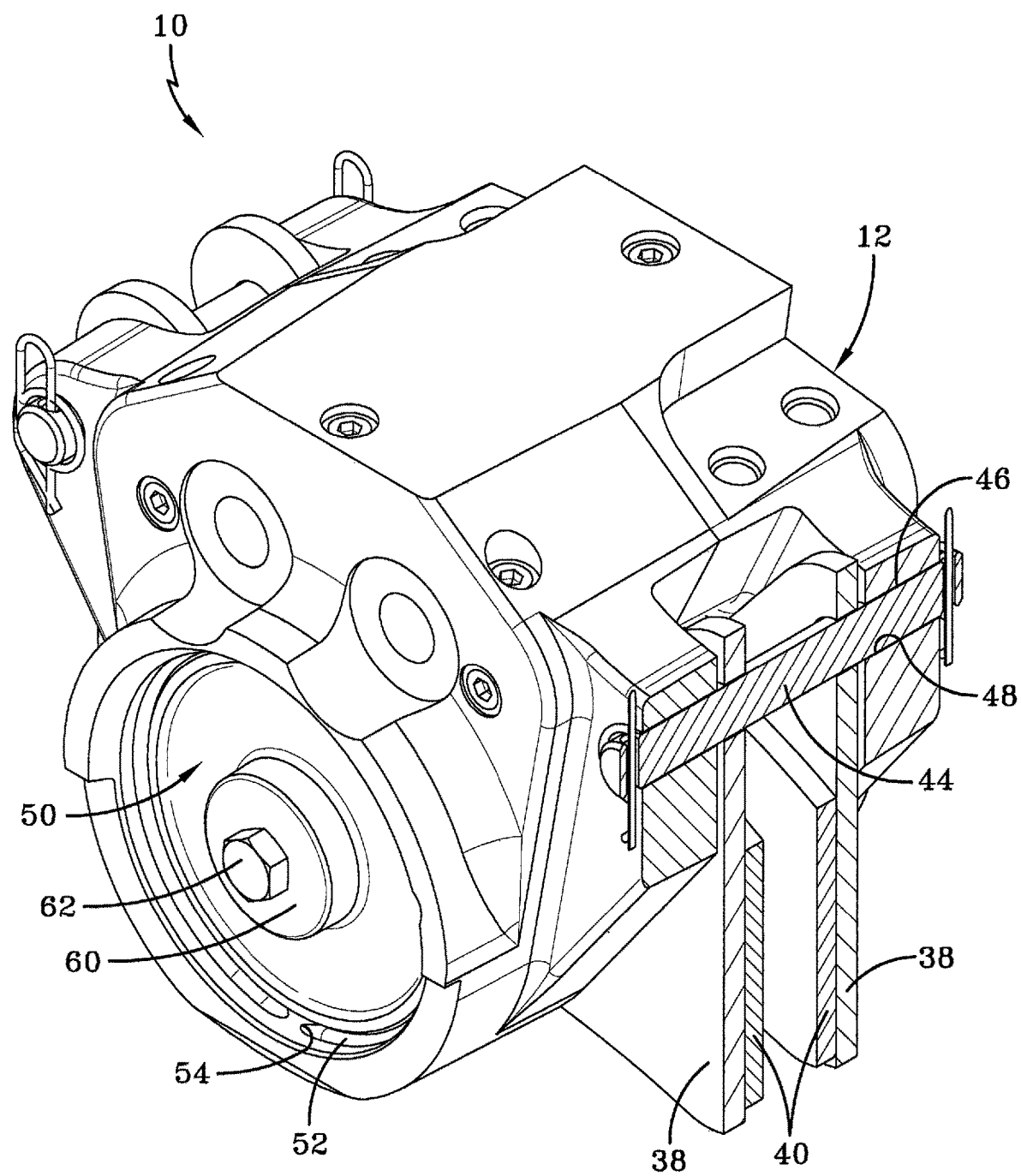
FIG. 4 is a sectional view through a torque pin of the hydraulic caliper disc brake according to the concepts of the present invention.
Figure 5:
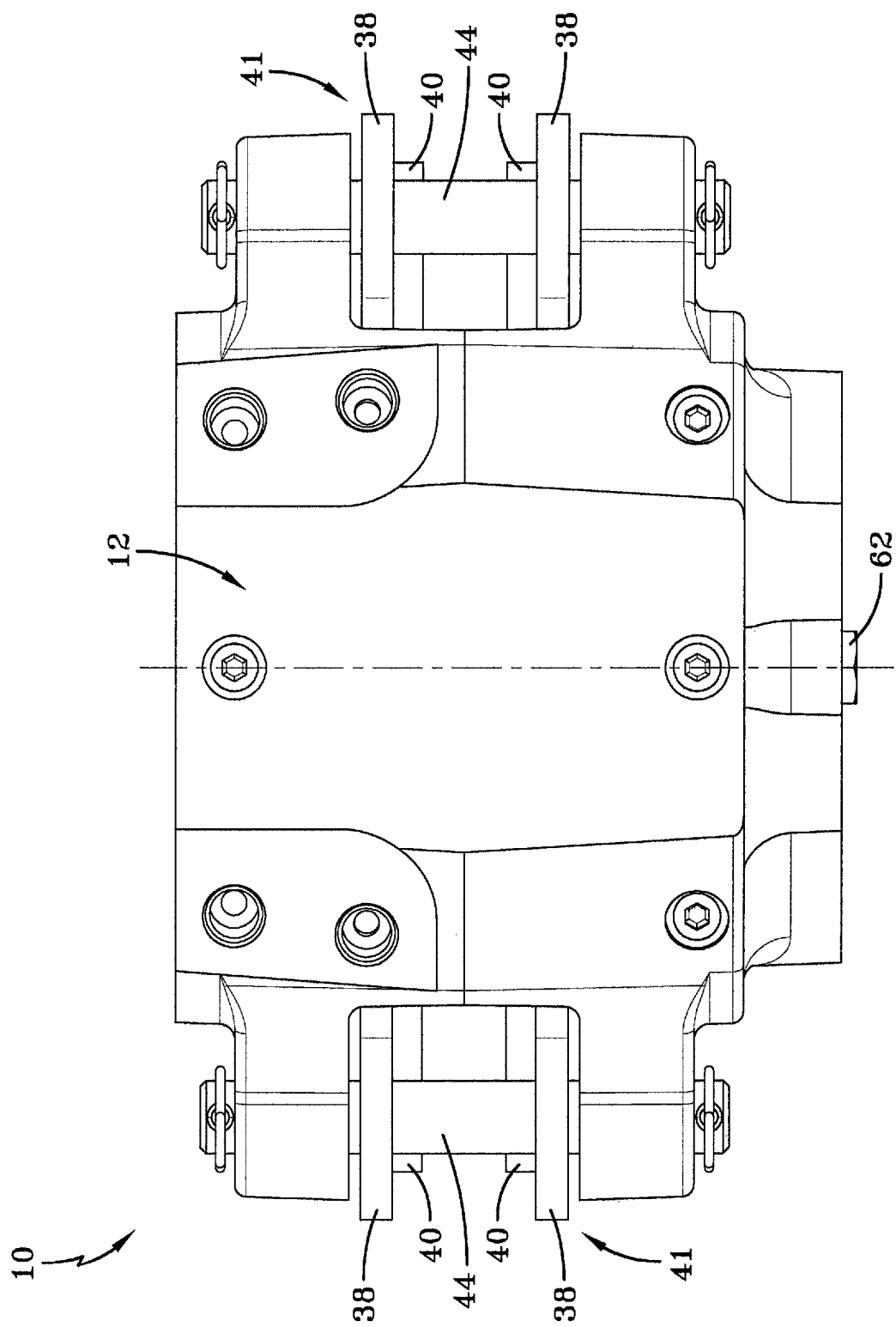
FIG. 5 is a top plan view of the hydraulic caliper disc brake according to the concepts of the present invention.

As shown in FIGS. 1, 2, and 4, second housing portion 12B may include a cap 50, which may also be referred to as retention component 50, enclosing second fluid chamber 19B. Cap 50 is mechanically held in place by way of a C-ring 52 adapted to fit within a C-ring groove 54 within second housing portion 12B. A combination of O-ring 56 and backup ring 58 further assist with cap 50 holding fluid pressure for second fluid chamber 19B (and first fluid chamber 19A) and thereby allowing pistons 18A, 18B to translate and thereby cause stator assemblies 41 to engage rotor 14.

With further description of C-ring 52, the outer surface of cap 50 and C-ring groove 54 allow C-ring 52 to be wedged into place to provide the mechanical securement of cap 50 in place. When in place, C-ring 52 has sufficient surface contact with the outer surface of cap 50 and C-ring groove 54. To remove C-ring 52, such as for offline service or maintenance, cap 50 may be pressed inward slightly such that a suitable tool may be inserted into C-ring groove 54 to pop out C-ring 52.

Cap 50 may further include a central extension portion 60 carrying a threaded fastener 62, such as a hex head bolt 62. Once C-ring 52 is removed, a puller tool can be used with threaded fastener 62 for removing cap 50.

The design and location of cap 50 may offer one or more advantages for brake 10. The location of cap 50 may allow for respective bores 64A, 64B of pistons 18A, 18B to be easily machined. The design and location of cap 50 also allows for servicing brake 10 without removing brake 10 from mounting bracket 16.

Referring now to FIGS. 10-15, hydraulic caliper disc brake 10 may include an alternative configuration for the pistons and the spherical-faced washers, which are labeled in FIGS. 10-15 as pistons 118A, 118B and spherical-faced washers 120A, 120B. Inasmuch as pistons 118A, 118B and spherical-faced washers 120A, 120B share many common aspects, the relevant portion of the above description with respect to brake 10, pistons 18A, 18B and spherical-faced washers 20A, 20B is also incorporated here to the extent applicable to pistons 118A, 118B and spherical-faced washers 120A, 120B. Other aspects of pistons 118A, 118B and spherical-faced washers 120A, 120B are further discussed herein below.

Figure 10:
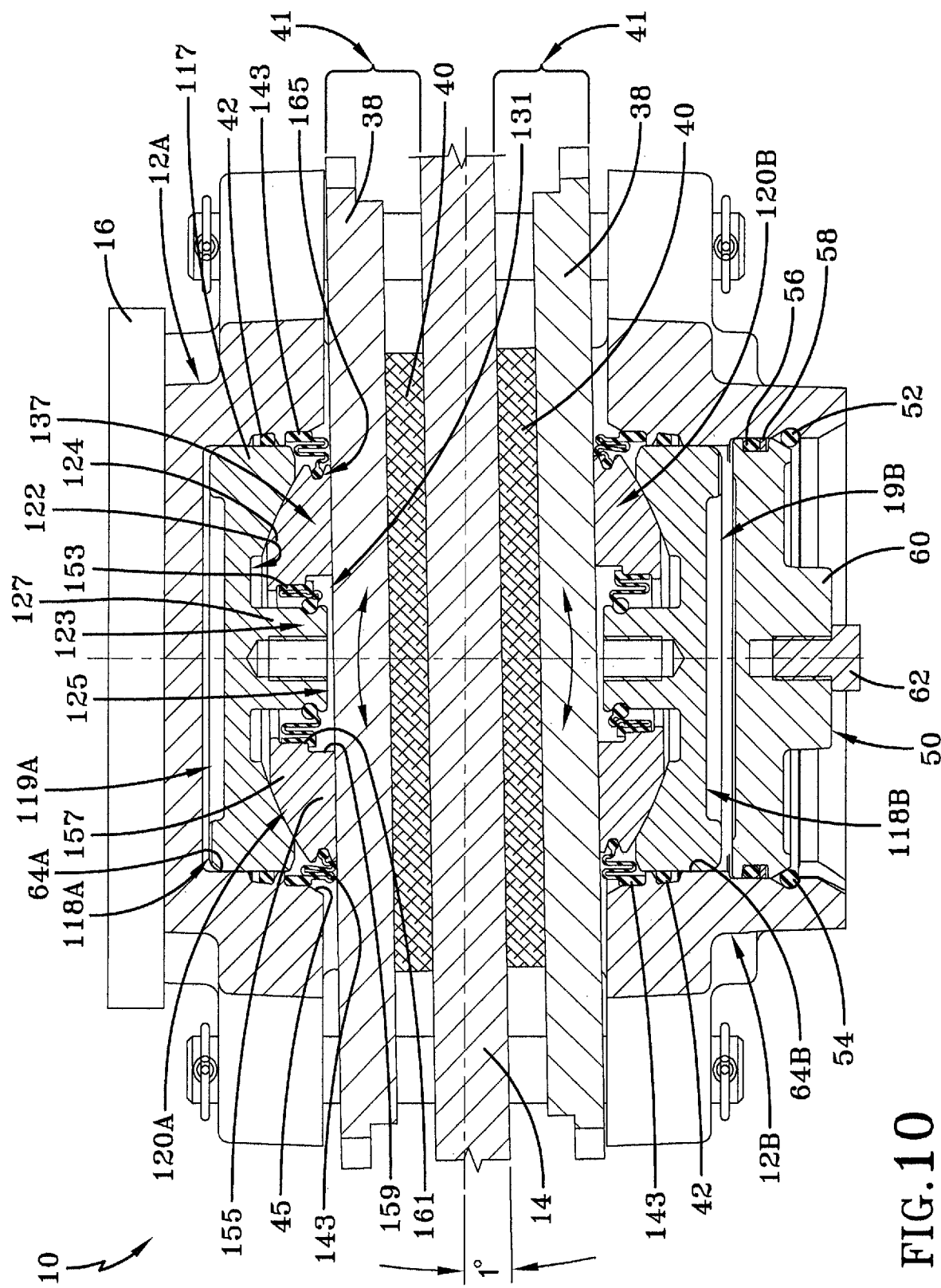
FIG. 10 is a top sectional view of the hydraulic caliper disc brake in the braking position showing an alternative configuration of the spherical-faced washer and the piston according to the concepts of the present invention.
Figure 11:
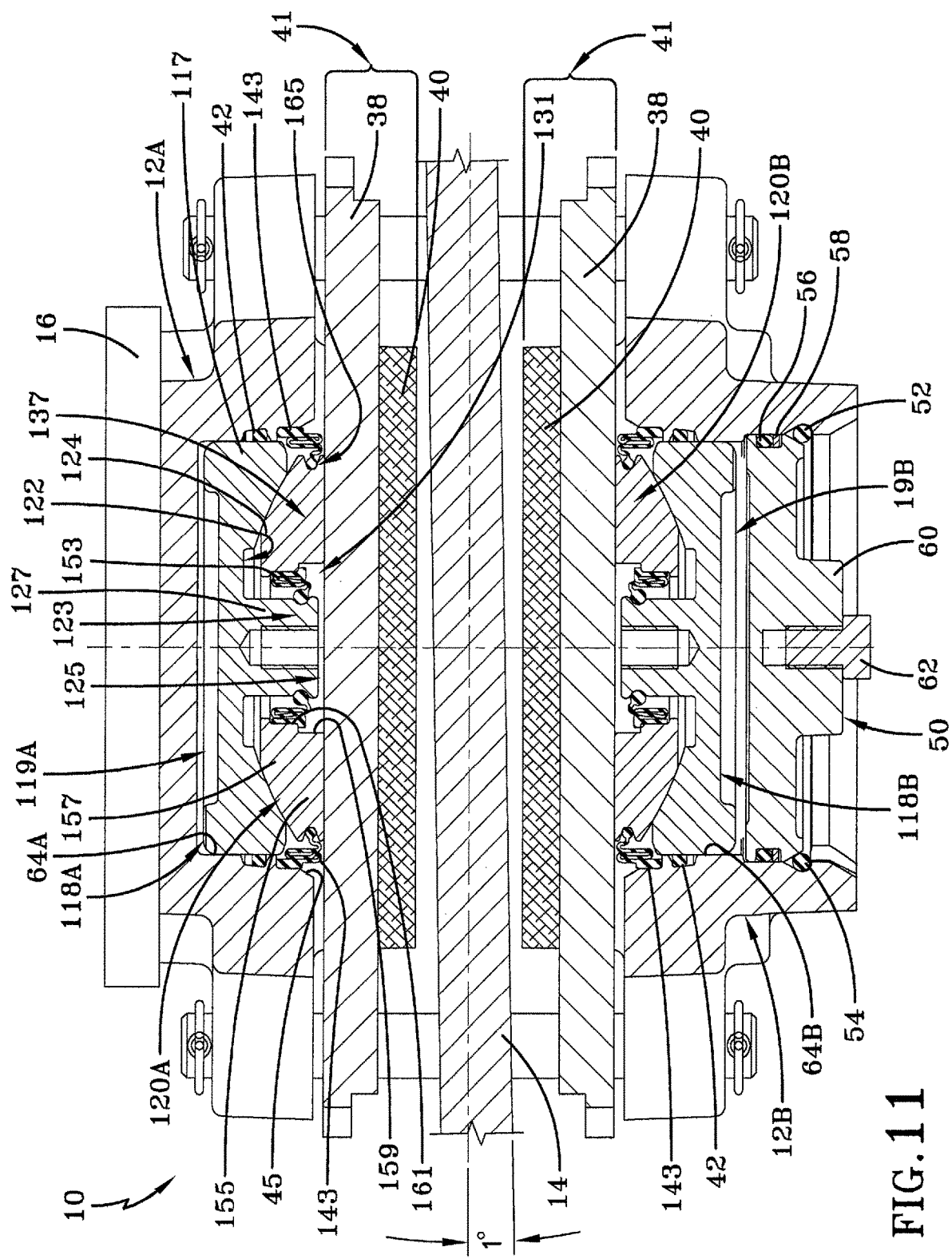
FIG. 11 is a top sectional view of the hydraulic caliper disc brake of FIG. 10, showing the brake in a non-braking position according to the concepts of the present invention.
Figure 12:
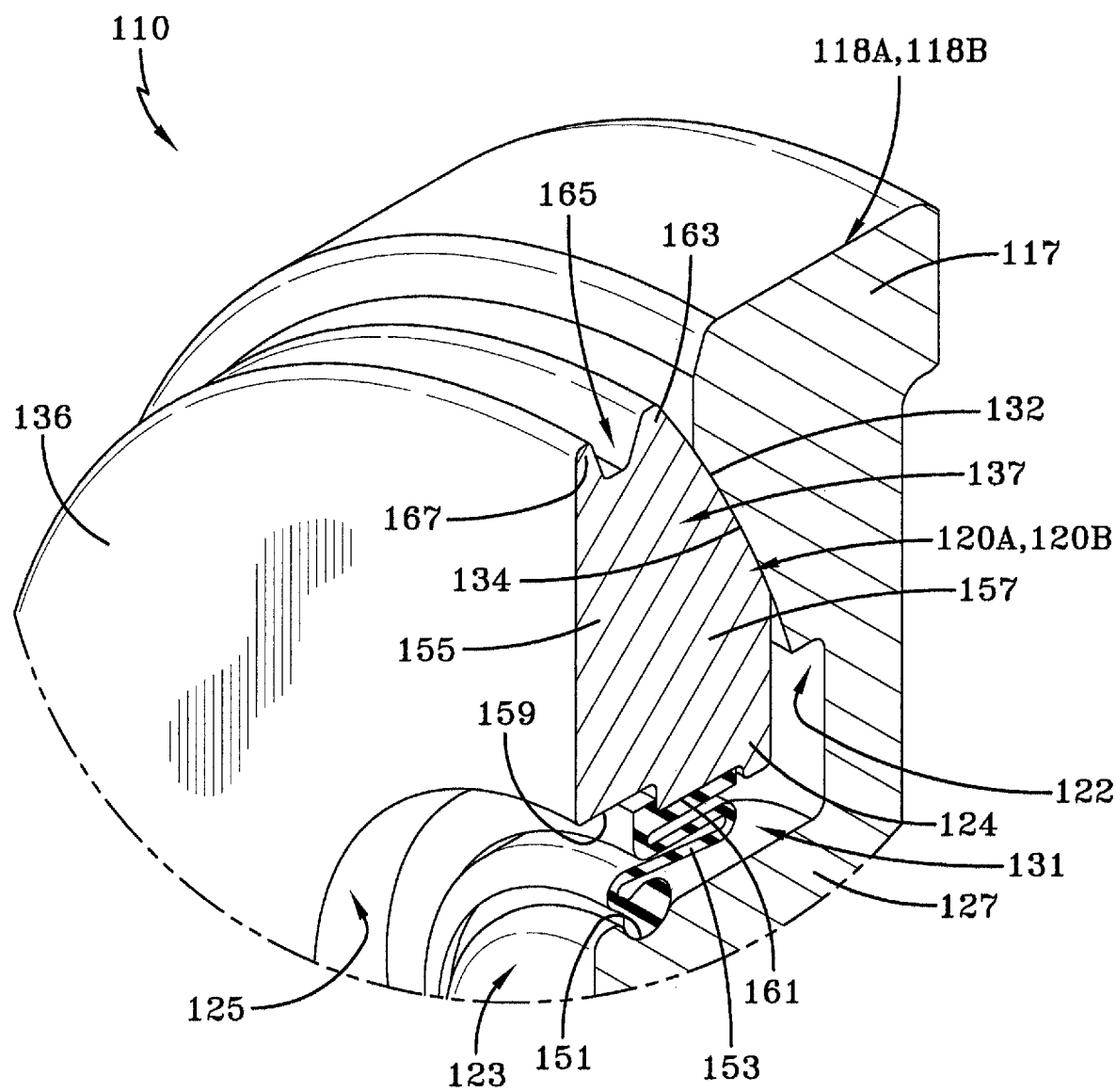
FIG. 12 is a cutaway view of the piston sub assembly of the hydraulic caliper disc brake of FIG. 10 according to the concepts of the present invention.

As shown at least in FIGS. 10-12, pistons 118A, 118B, which may also be referred to as alternative configuration pistons 118A, 118B, abuts, and may be said to carry, a respective spherical-faced washer 120A, 120B, which may also be referred to as spherical washers 120A, 120B or alternative configuration spherical-faced washers 120A, 120B. Similar to the above-described configuration, the configuration of pistons 118A, 118B and spherical-faced washers 120A, 120B allows spherical-faced washers 120A, 120B to move from a default position to a shifted position.

Pistons 118A, 118B include a respective generally cylindrical piston washer channel 122 in the generally position of a respective washer ring 124 of spherical washer 120A, 120B. Piston washer channel 122 may be internally defined by a piston retaining member 123 of piston 118A, 118B. Piston retaining member 123, or at least a portion thereof, is adapted to fit within a respective inner channel 125 of washer 120A, 120B.

As seen in FIGS. 10-12, piston retaining member 123 may be formed as a generally cylindrical body portion 127 having a boot groove 151 therein. Piston retaining member 123, and body portion 127 thereof, are centrally located with respect to the respective piston 118A, 118B. Each piston 118A, 118B includes a piston boot 153 around piston retaining member 123 that fits within respective piston boot groove 151. Piston boot 153 provides a secure fit, which may also be referred to as pressed in, within piston boot groove 151. As with O-ring 30, piston boot 153 generally serves to preclude entry of foreign matter. Based on the configuration including piston boot groove 151, piston retaining member 123 may be without a protruding ring (e.g. protruding ring 26 of pistons 18A, 18B).

With particular reference to FIG. 12, piston boot groove 151 is positioned within a channel opening 131 between piston 118A, 118B and spherical-faced washer 120A, 120B. Channel opening 131 is generally defined by the internal perimeter of spherical-faced washer 120A, 120B, and particularly a body portion 137 thereof.

As seen in FIGS. 10-12, channel opening 131 may be referred to as a stepped opening based on differing internal perimeters of body portion 137. More specifically, body portion 137, in addition to washer ring 124, includes a wider portion 155 and a narrower portion 157. Wider portion 155 defines a first perimeter surface 159 of channel opening 131 and narrower portion 157 defines a second perimeter portion 161 of channel opening 131. Piston boot 153 may particularly abut second perimeter portion 161, though piston boot 153 may also abut first perimeter surface 159 in other embodiments. Piston boot 153 may be said to be trapped in channel opening 131, which may also be used to ensure proper positioning of washers 120A, 120B during assembly, shipping, and installation of brake 10. Based on this configuration, it should be appreciated that there is little or no risk of washers 120A, 120B falling out from pistons 118A, 118B. When desired, such as for repair or maintenance, piston boot 153 may be removed with use of a suitable tool, in order to separate washers 120A, 120B from the respective piston 118A, 118B.

Figure 15:
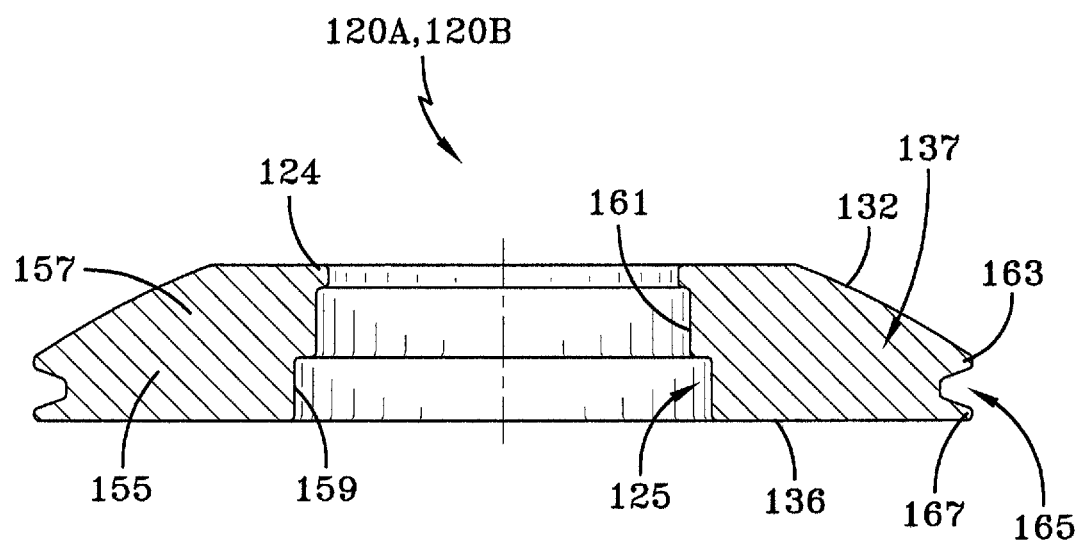
FIG. 15 is a sectional view through the alternative configuration spherical-faced washer according to the concepts of the present invention.

As shown in FIGS. 12 and 15, each spherical washer 120A, 120B includes a spherical washer face 132. Spherical washer face 132 is adapted to abut a respective spherical piston face 134 of pistons 118A, 118B, which may also be referred to as bearing against the respective spherical piston face 134. Spherical washer face 132 may be said to extend to a first lip 163 of a washer groove 165, as will be further described herein. Spherical piston face 134 may be without a lip (e.g. lip 35 of pistons 18A, 18B).

Spherical washer face 132 and spherical piston face 134 each have the shape of a portion of an outer surface of a sphere. This allows movement of spherical washer face 132 about spherical piston face 134 to a shifted position, as described elsewhere herein. Alternative definitions for the shape of spherical washer face 132 and spherical piston face 134 may include partially spherical, spherical segment, spherical frustum, spherical zone, or spherical cap with the top truncated.

With further reference to FIGS. 12-15, each spherical washer 120A, 120B includes a straight face 136, which may also be referred to as a flat face 136, opposing spherical face 132. As suggested above, straight face 136 and spherical face 132 define body portion 137 therebetween. In accord with the above discussion, straight face 136 abuts stator plate 38 and similar travel as described above may thereby be enacted.

Figure 13:
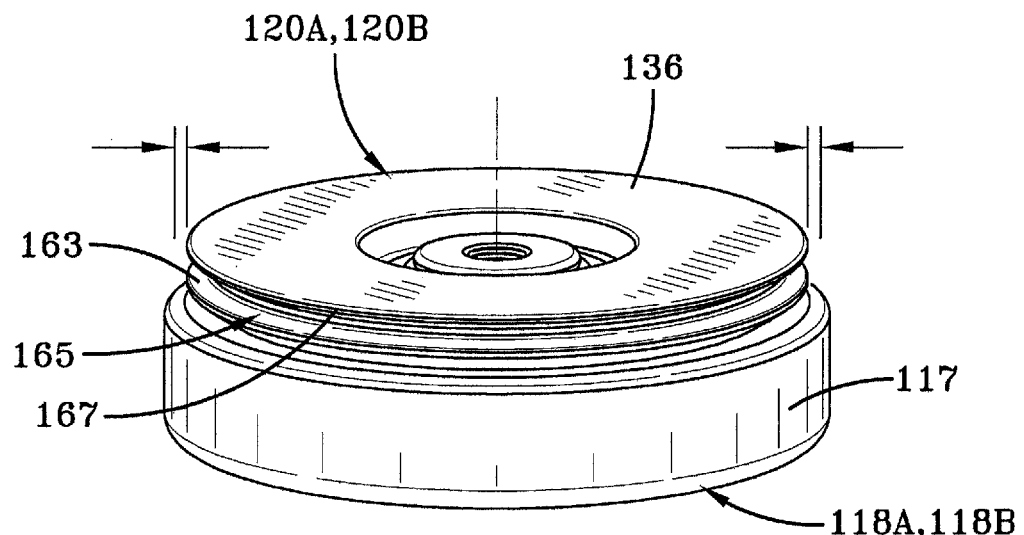
FIG. 13 is a perspective view of the alternative configuration of the spherical-faced washer and the piston of FIG. 10, showing the alternative configuration spherical-faced washer and piston in a default position according to the concepts of the present invention.
Figure 14:
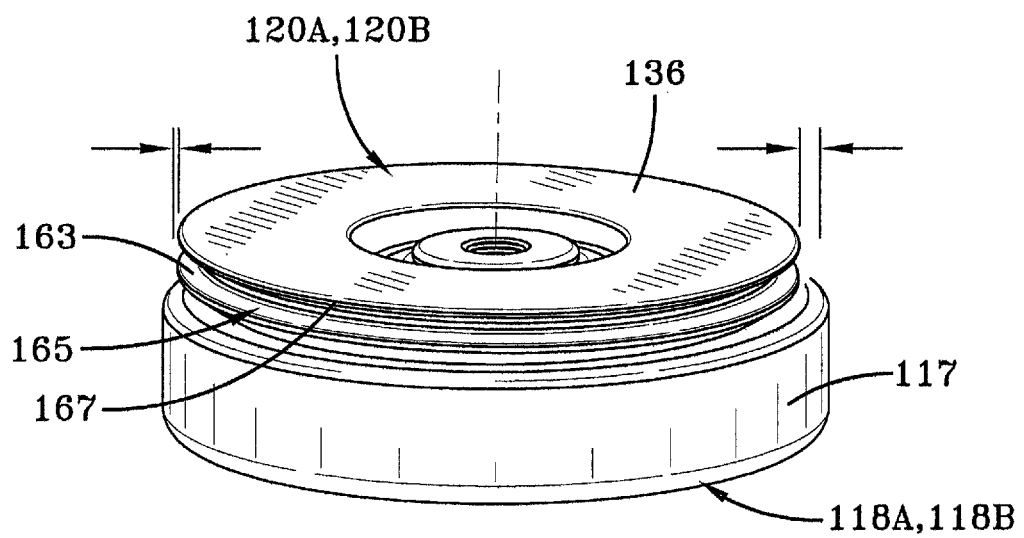
FIG. 14 is a perspective view of the alternative configuration spherical-faced washer and piston of FIG. 13, showing the alternative configuration spherical-faced washer in a shifted position according to the concepts of the present invention.

With further description of washer groove 165, as best seen in FIGS. 12-14, washer groove 165 includes first lip 163 extending to a second lip 167 to thereby define an opening (which itself may also be referred to as a groove) for receiving a portion of a piston boot 143. As with O-ring 30 and piston boot 153, piston boot 143 generally serves to preclude entry of foreign matter.

As further description of the advantages of the present invention, brake 10 and a method of operating brake 10 may avoid the need to shim an out-of-parallel mounting bracket 16 into alignment with the rotor 14. Thus, an installer of brake 10 may not require the special skills or training that may be associated with shimming an out-of-parallel mounting bracket 16 into alignment with the rotor 14. Brake 10 may also substantially avoid lock-up of pistons 18A, 18B during the operation of brake 10. This may thereby make brake 10 safer to operate.

Figure 8:
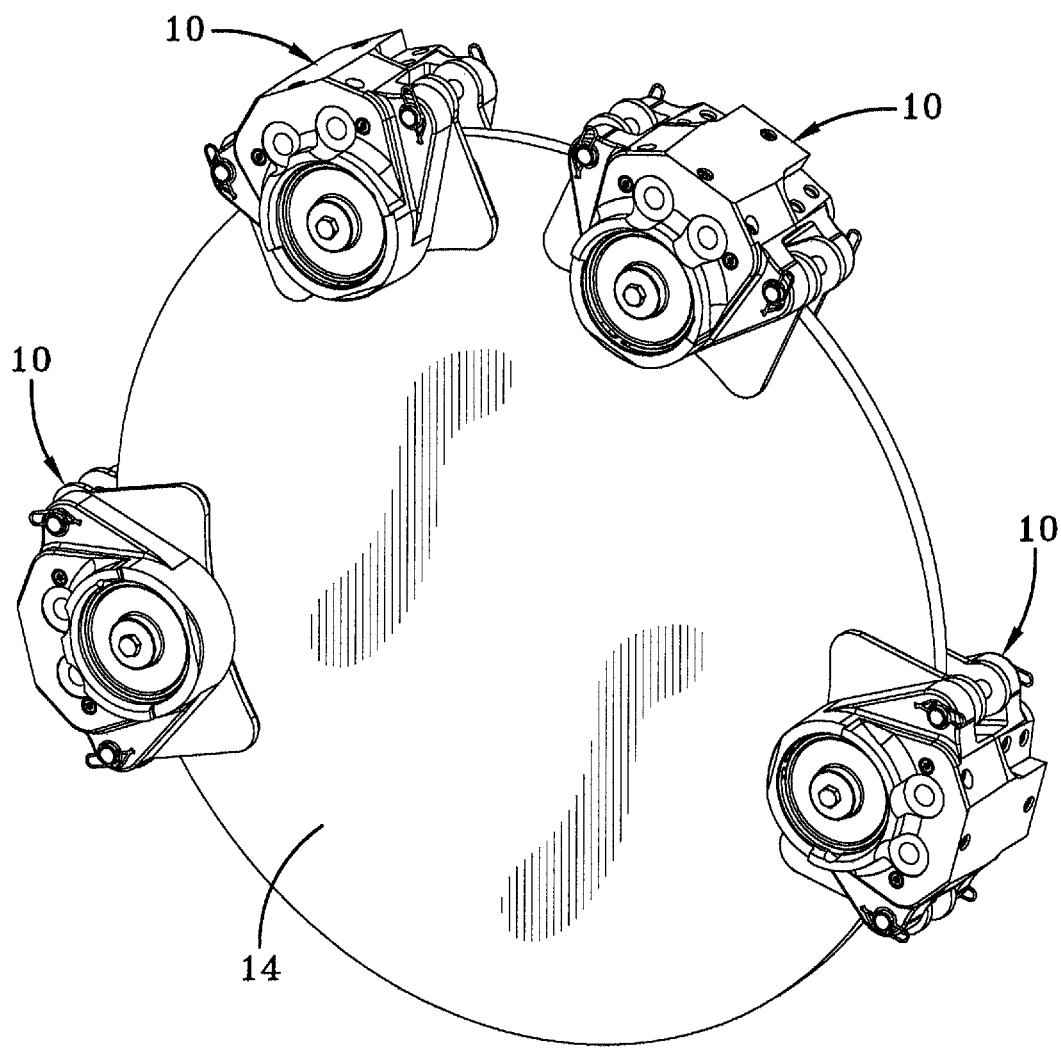
FIG. 8 is a perspective view of a plurality of the hydraulic caliper disc brakes in use with a rotor according to the concepts of the present invention.

In one or more embodiments, as shown in FIG. 8, a plurality of brakes 10 may be used with rotor 14. In one or more embodiments, four brakes 10 may be used with rotor 14. In one or more embodiments, four brakes 10 and rotor 14 may be used with a tractor or farm tanker.

It is thus evident that a hydraulic caliper disc brake constructed as described herein and corresponding methods accomplish the objects of the present invention and otherwise substantially improves the art.

What is claimed is:

1. A hydraulic caliper disc brake comprising
an opposing pair of pistons adapted to act on
an opposing pair of washers adapted to act on
an opposing pair of stator assemblies,
    each of the pistons comprising a spherical piston face and a piston chamfer in an axial face groove of the piston,
    each of the washers comprising
        a spherical washer face abutting a respective one of the spherical piston faces, a straight washer face opposite the spherical washer face and abutting a respective one of the stator assemblies, and
a washer chamfer positioned in the axial face groove of the piston and facing a respective one of the piston chamfers to thereby define a corresponding chamfer channel having a respective O-ring positioned therein.

2. The hydraulic caliper disc brake of claim 1,
each of the pistons further comprising a generally cylindrical piston washer channel, and
each of the washers further comprising a retaining washer ring positioned in a respective one of the piston washer channels.

3. The hydraulic caliper disc brake of claim 2,
each of the washers further comprising an inner washer channel, and
each of the pistons further comprising a retaining piston ring adapted to fit within a respective one of the inner washer channels.

4. The hydraulic caliper disc brake of claim 1 in combination with a rotor,
where, in a default position of the hydraulic caliper disc brake, the rotor is in an out-of-parallel position with respect to the pair of pistons, the pair of washers, and the pair of stator assemblies,
where, in a braking position of the hydraulic caliper disc brake the pair of washers and the pair of stator assemblies are shifted to a parallel position with respect to the rotor.

5. A method of operating the hydraulic caliper disc brake of claim 1, the method comprising steps of
providing the hydraulic caliper disc brake,
providing hydraulic force to each of the pistons to thereby cause the pistons to move the stator assemblies toward a rotor, and
allowing, upon contact of the stator assemblies with the rotor, each of the washers to shift with respect to the rotor, such that the stator assemblies become parallel with the rotor.

6. A hydraulic caliper disc brake comprising,
an opposing pair of pistons adapted to act on
an opposing pair of washers adapted to act on
an opposing pair of stator assemblies,
each of the pistons comprising
a spherical piston face, and
a piston chamfer formed by an outer diameter of a retaining piston ring,
each of the washers comprising
a spherical washer face abutting a respective one of the spherical piston faces,
a straight washer face opposite the spherical washer face and abutting a respective one of the stator assemblies, and
a washer chamfer formed in an inner diameter of the washer and facing that faces a respective one of the piston chamfers to thereby define a corresponding chamfer channel having a respective O-ring positioned therein.

7. A hydraulic caliper disc brake comprising,
an opposing pair of pistons adapted to act on
an opposing pair of washers adapted to act on
an opposing pair of stator assemblies,
each of the pistons comprising
a spherical piston face,
a generally cylindrical piston washer channel, and
a retaining piston ring
each of the washers comprising
a spherical washer face abutting a respective one of the spherical piston faces,
a straight washer face opposite the spherical washer face and abutting a respective one of the stator assemblies,
a retaining washer ring positioned in a respective one of the piston washer channels, and
an inner washer channel,
where the retaining piston ring is adapted to fit within a respective one of the inner washer channels,
each of the pistons further comprising a piston chamfer, and
each of the washers further comprising a washer chamfer that faces a respective one of the piston chamfers to thereby define a corresponding chamfer channel,
each of the chamfer channels comprising a respective O-ring positioned therein,
each of the spherical washer faces extending to a respective one of the retaining washer rings,
where an inner portion of each of the retaining washer rings defines the washer chamfers, and
where an inner portion of each of the retaining piston rings defines the piston chamfers.

8. The hydraulic caliper disc brake of claim 7 in combination with a rotor,
where, in a default position of the hydraulic caliper disc brake, the rotor is in an out-of-parallel position with respect to the pair of pistons, the pair of washers, and the pair of stator assemblies,
where, in a braking position of the hydraulic caliper disc brake the pair of washers and the pair of stator assemblies are shifted to a parallel position with respect to the rotor.

9. The hydraulic caliper disc brake and rotor of claim 8, where the amount of shifting of the pair of washers and the pair of stator assemblies is about 1 degree with respect to the rotor.

10. The hydraulic caliper disc brake and rotor of claim 8, where the amount of shifting of the pair of washers and the pair of stator assemblies is from about 0.5 degrees to about 2 degrees with respect to the rotor.

11. A method of operating the hydraulic caliper disc brake of claim 7, the method comprising steps of
providing the hydraulic caliper disc brake,
providing hydraulic force to each of the pistons to thereby cause the pistons to move the stator assemblies toward a rotor, and
allowing, upon contact of the stator assemblies with the rotor, each of the washers to shift with respect to the rotor, such that the stator assemblies become parallel with the rotor.

12. A hydraulic caliper disc brake comprising,
an opposing pair of pistons adapted to act on
an opposing pair of washers adapted to act on
an opposing pair of stator assemblies,
each of the pistons comprising a spherical piston face,
each of the washers comprising
a spherical washer face abutting a respective one of the spherical piston faces,
a straight washer face opposite the spherical washer face and abutting a respective one of the stator assemblies, and
a stepped inner washer channel, and
each of the pistons further comprising a retaining member unitary with a body portion of the piston, at least a portion of the retaining member adapted to fit within a respective one of the stepped inner washer channels to thereby define respective channel openings, each of the channel openings include a respective piston boot.

13. The hydraulic caliper disc brake of claim 12, each of the washers further comprising a respective outer surface having a respective groove therein for receiving a respective second piston boot.

14. A method of operating the hydraulic caliper disc brake of claim 13, the method comprising steps of providing the hydraulic caliper disc brake, providing hydraulic force to each of the pistons to thereby cause the pistons to move the stator assemblies toward a rotor, and allowing, upon contact of the stator assemblies with the rotor, each of the washers to shift with respect to the rotor, such that the stator assemblies become parallel with the rotor.

\* \* \* \* \*